US011144788B2

(12) United States Patent
Viswanathan

(10) Patent No.: US 11,144,788 B2
(45) Date of Patent: Oct. 12, 2021

(54) METHOD AND APPARATUS FOR PROVIDING A LOW-POWER PERCEPTION ARCHITECTURE

(71) Applicant: HERE GLOBAL B.V., Eindhoven (NL)

(72) Inventor: Anirudh Viswanathan, Berkeley, CA (US)

(73) Assignee: HERE Global B.V., Eindhoven (NL)

( * ) Notice: Subject to any disclaimer, the term of this patent is extended or adjusted under 35 U.S.C. 154(b) by 96 days.

(21) Appl. No.: 16/209,588

(22) Filed: Dec. 4, 2018

(65) Prior Publication Data

US 2020/0175339 A1 Jun. 4, 2020

(51) Int. Cl.
*G06K 9/62* (2006.01)
*G06K 9/60* (2006.01)

(52) U.S. Cl.
CPC ............. *G06K 9/6262* (2013.01); *G06K 9/60* (2013.01)

(58) Field of Classification Search
CPC .... G06F 1/3287; G06F 1/3212; G06F 1/3206; G06N 3/0454; G06N 3/08; G06N 20/00; G05D 2201/0213; G05D 1/0221; G05D 1/0088; G05D 1/0246; A61B 2560/0209; G06K 9/00798; G06K 9/00805; G06K 9/00825; G06K 9/00791; G01S 13/88; G01S 7/417; G01S 13/42; G01S 13/426; G01S 13/867; G01S 13/89; G06T 2207/20081; G06T 2207/20084
See application file for complete search history.

(56) References Cited

U.S. PATENT DOCUMENTS

| 10,140,553 | B1* | 11/2018 | Vasisht | G06N 3/0454 |
| 2004/0096100 | A1* | 5/2004 | Ii | G06K 9/628 |
| | | | | 382/159 |
| 2008/0182630 | A1* | 7/2008 | Parks | G06F 1/266 |
| | | | | 455/574 |
| 2011/0268425 | A1* | 11/2011 | Glen | H04N 19/44 |
| | | | | 386/272 |

(Continued)

FOREIGN PATENT DOCUMENTS

| EP | 3132329 A1 | 2/2017 |
| JP | H0635888 A | 2/1994 |
| WO | 2015160590 A1 | 10/2015 |

OTHER PUBLICATIONS

Nagi et al., "Max-Pooling Convolutional Neural Networks for Vision-based Hand Gesture Recognition", IEEE 2011 (Year: 2011).*

(Continued)

*Primary Examiner* — Dung Hong
(74) *Attorney, Agent, or Firm* — Ditthavong, Steiner & Mlotkowski

(57) ABSTRACT

An approach is provided for providing a lower-power perception architecture. The approach involves, for example, determining that a device is equipped with a first perception system and a second perception system. The second perception system operates in a lower-power consumption mode than the first perception system to process image data for image recognition. The approach also involves determining a battery level of the device. The approach further involves switching from the first perception system to the second perception system based on determining that the battery level is below a threshold battery level.

20 Claims, 10 Drawing Sheets

(56) References Cited

U.S. PATENT DOCUMENTS

| | | | |
|---|---|---|---|
| 2013/0271474 A1* | 10/2013 | Apodaca | G06F 1/3212 345/501 |
| 2015/0293575 A1* | 10/2015 | Hampson | G06F 1/3212 713/323 |
| 2016/0066266 A1* | 3/2016 | Law | H04W 52/028 455/574 |
| 2016/0173752 A1* | 6/2016 | Caviedes | H04N 5/23229 348/207.11 |
| 2016/0358070 A1* | 12/2016 | Brothers | G06N 3/0454 |
| 2017/0270408 A1* | 9/2017 | Shi | G06N 3/04 |
| 2018/0144436 A1* | 5/2018 | Apodaca | G06F 1/329 |
| 2018/0253647 A1* | 9/2018 | Yu | G06F 17/16 |
| 2019/0004535 A1* | 1/2019 | Huang | G05D 1/0251 |
| 2020/0090322 A1* | 3/2020 | Seo | G06K 9/036 |
| 2020/0160186 A1* | 5/2020 | Lesso | G06N 3/0635 |

OTHER PUBLICATIONS

Office Action for related European Patent Application No. 19213544.0-1207, dated Apr. 2, 2020, 10 pages.

Sze et al., "Efficient Processing of Deep Neural Networks: A Tutorial and Survey", Mar. 27, 2017, pp. 1-31.

Cai et al., "Neuralpower: Predict and Deploy Energy-efficient Convolutional Neural Networks," Oct. 15, 2017, retrieved from https://arxiv.org/pdf/1710.05420.pdf, pp. 1-16.

Stamoulis et al., "HyperPower: Power- and Memory-Constrained Hyper-Parameter Optimization for Neural Networks," Dec. 6, 2017, retrieved from https://arxiv.org/pdf/1712.02446.pdf, pp. 1-7.

Sanchez, "Adapting Deep Neural Networks to a Low-power Environment," 2017, retrieved from https://upcommons.upc.edu/bitstream/handle/2117/106673/126470.pdf, pp. 1-95.

Pham et al., "Faster Discovery of Neural Architectures by Searching for Paths in a Large Model," Feb. 15, 2018, retrieved from https://openreview.net/pdf?id=ByQZjx-0-, pp. 1-14.

Hu et al., "Energy Management Strategy for a Hybrid Electric Vehicle Based on Deep Reinforcement Learning," Article, published in Applied Sciences 8(2):187, Jan. 26, 2018, retrieved from www.mdpi.com/2076-3417/8/2/187/pdf, pp. 1-15.

\* cited by examiner

METHOD AND APPARATUS FOR PROVIDING A LOW-POWER PERCEPTION ARCHITECTURE

BACKGROUND

Autonomous driving has quickly become an area of interest for vehicle manufactures and navigation/mapping service providers. One particular area of interest is the development of perception or computer vision systems (e.g., machine learning-based systems) used to identify relevant environmental features like lane lines, other cars, signs, etc. for safe driving. Currently, these perception systems of compute intensive and consume a considerable amount of electrical power, which can affect vehicle performance particularly when the vehicle is battery powered (e.g., electric vehicles).

SOME EXAMPLE EMBODIMENTS

Therefore, there is a need for an approach for providing a low-power perception architecture (e.g., for use in vehicles and/or other battery-operated or power-constrained devices).

According to one embodiment, a computer-implemented method for providing a low-power perception architecture comprises determining that a device is equipped with a first perception system and a second perception system. The second perception system operates in a lower-power consumption mode than the first perception system to process image data for image recognition. The method also comprises determining a battery level of the device. The method further comprises switching from the first perception system to the second perception system based on determining that the battery level is below a threshold battery level.

According to another embodiment, an apparatus for providing a low-power perception architecture, comprises at least one processor, and at least one memory including computer program code for one or more computer programs, the at least one memory and the computer program code configured to, with the at least one processor, cause, at least in part, the apparatus to determine that a device is equipped with a first perception system and a second perception system. The second perception system operates in a lower-power consumption mode than the first perception system to process image data for image recognition. The apparatus is also caused to determine a battery level of the device. The apparatus is further caused to switch from the first perception system to the second perception system based on determining that the battery level is below a threshold battery level.

According to another embodiment, a non-transitory computer-readable storage medium for providing a low-power perception architecture carries one or more sequences of one or more instructions which, when executed by one or more processors, cause, at least in part, an apparatus to determine that a device is equipped with a first perception system and a second perception system. The second perception system operates in a lower-power consumption mode than the first perception system to process image data for image recognition. The apparatus is also caused to determine a battery level of the device. The apparatus is further caused to switch from the first perception system to the second perception system based on determining that the battery level is below a threshold battery level.

According to another embodiment, an apparatus for providing a low-power perception architecture comprises means for determining that a device is equipped with a first perception system and a second perception system. The second perception system operates in a lower-power consumption mode than the first perception system to process image data for image recognition. The apparatus also comprises means for determining a battery level of the device. The apparatus further comprises means for switching from the first perception system to the second perception system based on determining that the battery level is below a threshold battery level.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing a low-power perception architecture are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
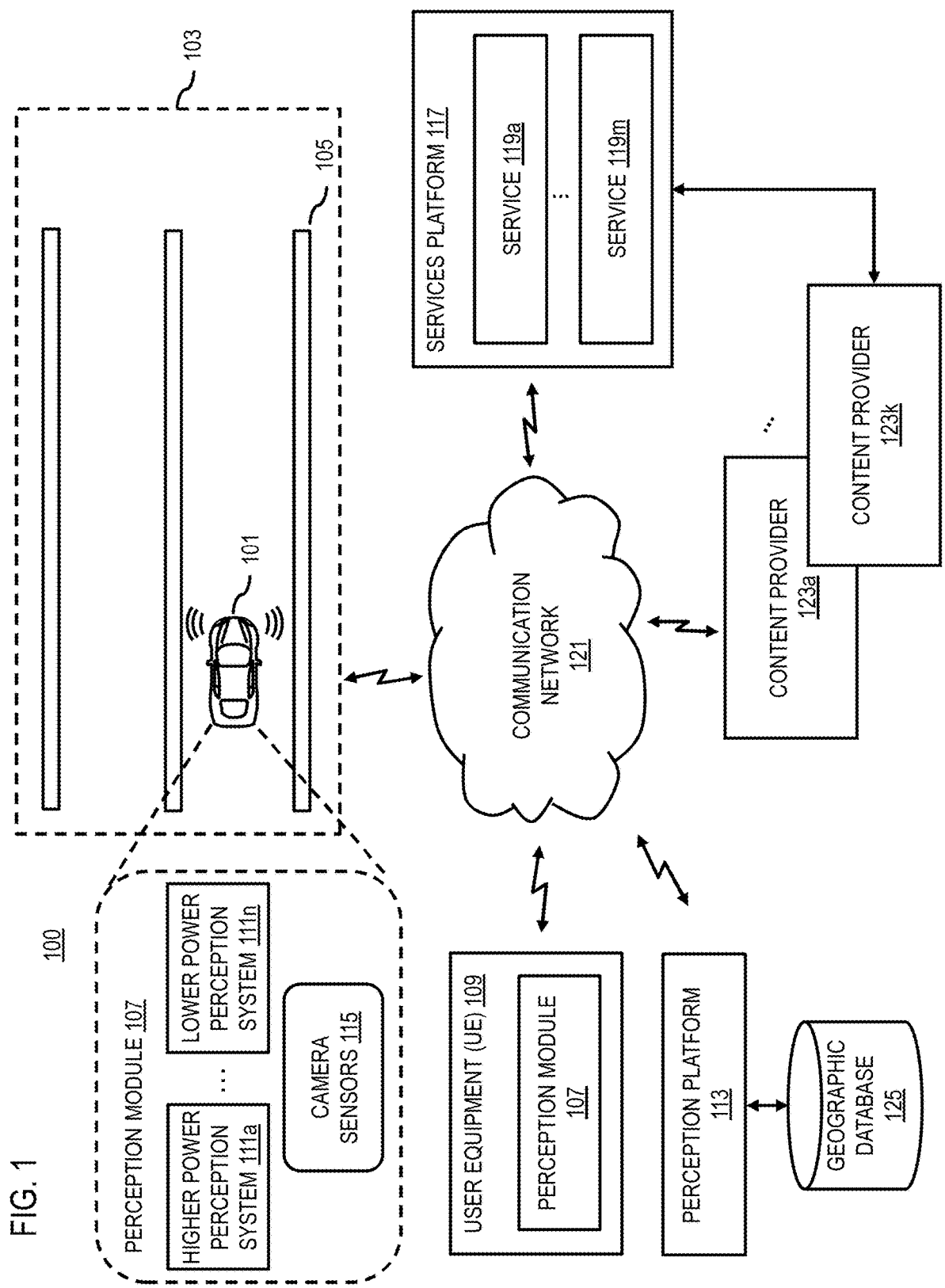
FIG. 1 is a diagram of a system capable of providing a low-power perception architecture, according to one embodiment.

FIG. 1 is a diagram of a system capable of providing a low-power perception architecture, according to one embodiment. As discussed above, autonomous driving has quickly become an area of intense interest, with recent advances in machine learning, computer vision and compute power enabling real-time mapping and sensing of a vehicle's environment. Such an understanding of the environment enables autonomous, semi-autonomous, or highly assisted driving in a vehicle (e.g., a vehicle 101) in at least two distinct ways.

First, real-time sensing of the environment provides information about potential obstacles, the behavior of others on the road, and safe, drivable areas. An understanding of where other cars are and what they might do is critical for a vehicle 101 to safely plan a route within geographic area 103 including a road network 105. Moreover, vehicles 101 generally must avoid both static (e.g., medians, lamp posts, signs, etc.) and dynamic (e.g., other vehicles, pedestrians, etc.) obstacles, and these obstacles may change or appear in real-time. More fundamentally, vehicles 101 can use a semantic understanding of what areas around them are navigable and safe for driving. Even in a situation where the world is completely mapped in high resolution, exceptions will occur in which a vehicle 101 might need to drive off the road to avoid a collision, or where a road's geometry or other map attributes like direction of travel have changed. In this case, detailed mapping may be unavailable, and the vehicle 101 has to navigate using real-time sensing of road features or obstacles using a computer vision system (e.g., a perception system 107).

A second application of vision techniques or perception systems in autonomous driving is localization of the vehicle 101 with respect to a map of reference landmarks. Understanding one's location on a map enables planning of a route, both on fine and coarse scales. On a coarse scale, navigation maps allow vehicles 101 to know what roads to use to reach a particular destination. However, on a finer scale, maps allow vehicles 101 to know what lanes to be in and when to make lane changes. Knowing this information is important for planning an efficient and safe route, for in complicated driving situations maneuvers need to be executed in a timely fashion, and sometimes before they are visually obvious. In addition, localization with respect to a map enables the incorporation of other real-time information into route planning. Such information could include traffic, areas with unsafe driving conditions (ice, fog, potholes, e.g.), and temporary road changes like construction.

In one embodiment, a perception system 107 of a vehicle 101 or other device such as a user equipment (UE) device 109 (e.g., smartphone, computer, or other mobile device) includes at least one perception system 111a comprising a neural network (or other machine learning model) which is deployed on-board a co-processing unit (e.g., a graphics processing unit (GPU), dedicated machine learning chip, or other system on a chip). In one embodiment, the neural network is trained offline using a GPU cluster or equivalent (e.g., in a perception platform 113) and subsequently deployed to the vehicle 101 and/or UE 109 by the perception platform 113 to recognize objects (e.g., map or environmental features) in image data collected by camera sensors 115 of the perception system 107 of the vehicle 101 or UE 109.

Historically, the perception module or system (e.g., a traditional higher power perception system 111a) is power-heavy and consumes significant amounts of power. However, low-power consumption is critical to vehicle 101 or UE 109 performance, particularly when the vehicle 101 or UE 109 is battery constrained. For example, for an electric-self-driving car, when the battery is running low, traditional higher power consumption perception systems 111a can create a battery drain that can reduce vehicle range and/or available battery power needed to support vehicle safety functions before reaching the nearest charging station. In other words, the problem is that power-considerations are generally not taken into account in the perception system design stage, and usually only a single perception system (e.g., a traditional higher power consumption perception system 111a with perhaps an equivalent power consuming fallback system) is deployed to the vehicle 101 or UE 109. As a result, vehicle/device manufacturers and service providers face significant technical challenges to reducing power consumption of traditional perception systems.

To address these technical challenges, the system 100 of FIG. 1 introduces a low-power approach to perception system selection. In one embodiment, the system 100 provides a two-fold approach to solving these technical challenges. First, the system 100 provides one or more secondary low-power perception systems (e.g., lower power perception system 111n) that the perception system 107 falls back on if the power-levels of the vehicle 101 or UE 109 fall below a specified threshold. In other words, the system 100 can equip or otherwise determine that the vehicle 101 and/or UE 109 are equipped with a perception system 107 that includes both a traditional high power consumption perception system 111*a* and/or one or more secondary low-power consumption perception systems 111*n* (also collectively referred to as perception systems 111). The secondary low-power perception systems 111 can be based on architectures that provide varying degrees of power consumption reduction relative to the high power perception system 111*a*. Then, the system 100 configures to the perception moduel 107 to select which of the perception systems 111 (e.g., high power perception system 111*a* and/or any of the secondary low power perceptions systems 111) to use based on available power of the corresponding vehicle 101 or UE 109.

In a second example aspect or embodiment, the system 100 can optimize the low power perception systems 101 to reduce power consumption by training the machine learning model of the perception systems 111 using a cost function based on power consumption reduction alone or in combination with accuracy of object detection. More specifically, in one embodiment, the system 100 provides an architecture search that identifies candidate low power configurations or architectures of the machine learning model (e.g., inter-nodal connections of a neural network) that optimizes for power consumption during machine learning model training using a fuzzy-approach (e.g., described in more detail below).

Figure 2:
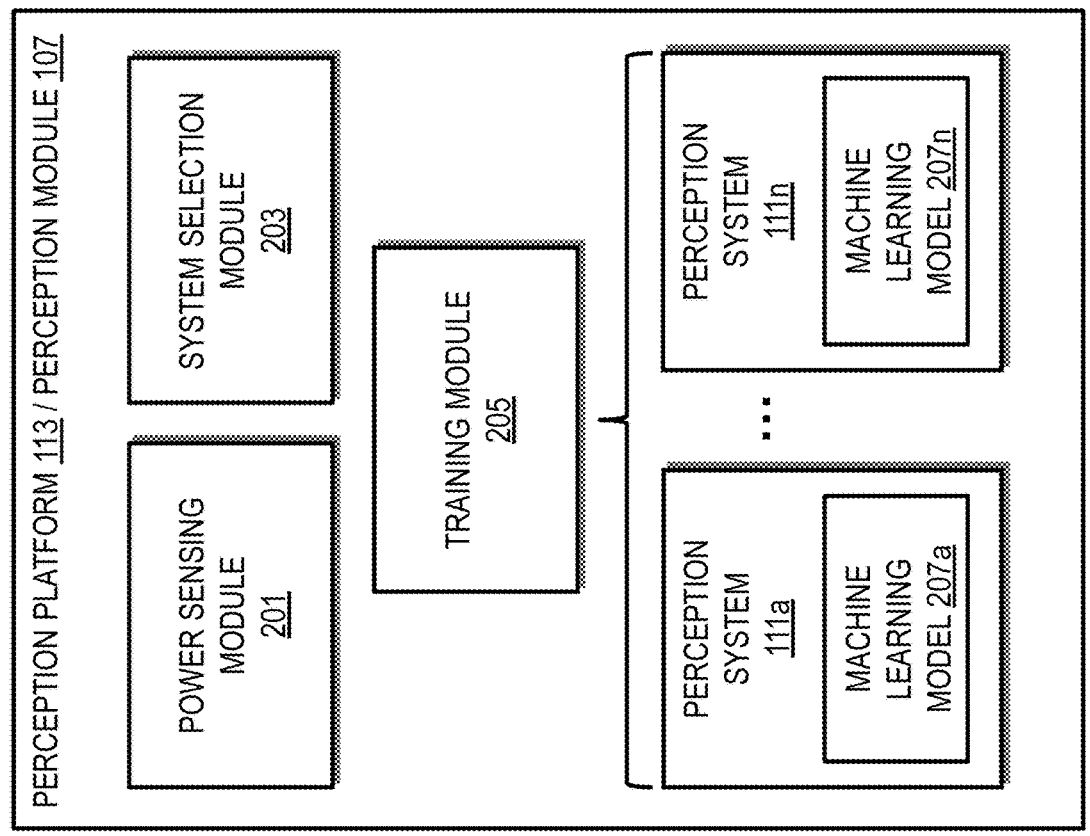
FIG. 2 is a diagram of the components of a perception platform, according to one embodiment.

In one embodiment, the perception platform 113 (e.g., a server-side component) alone or in combination with the perception system 107 (e.g., a local or deployed component of the vehicle 101 or UE 109) includes one or more components for providing a low power perception architecture. As shown in FIG. 2, the perception platform 113 and/or perception system 107 includes a power sensing module 201, a system selection module 203, and a training module 205. In one embodiment, the training module 205 can connectivity respective machine learning models 207*a*-207*n* (also collectively referred to as machine learning models 207) of the perception system 111*a*-111*n*. The above presented modules and components of the perception platform 113 and/or perception system 107 can be implemented in hardware, firmware, software, or a combination thereof. It is contemplated that the functions of these components may be combined or performed by other components of equivalent functionality. Though depicted as separate entities in FIG. 1, it is contemplated the perception platform 113 and/or perception system 107 may be implemented as a module of any of the components of the system 100. In one embodiment, the perception platform 113, perception system 107, and/or any of the modules 201-205 may be implemented as a cloud-based service, local service, native application, or combination thereof. The functions of the perception platform 113, perception system 107, and/or these modules are discussed with respect to FIGS. 3-6 below.

Figure 3:
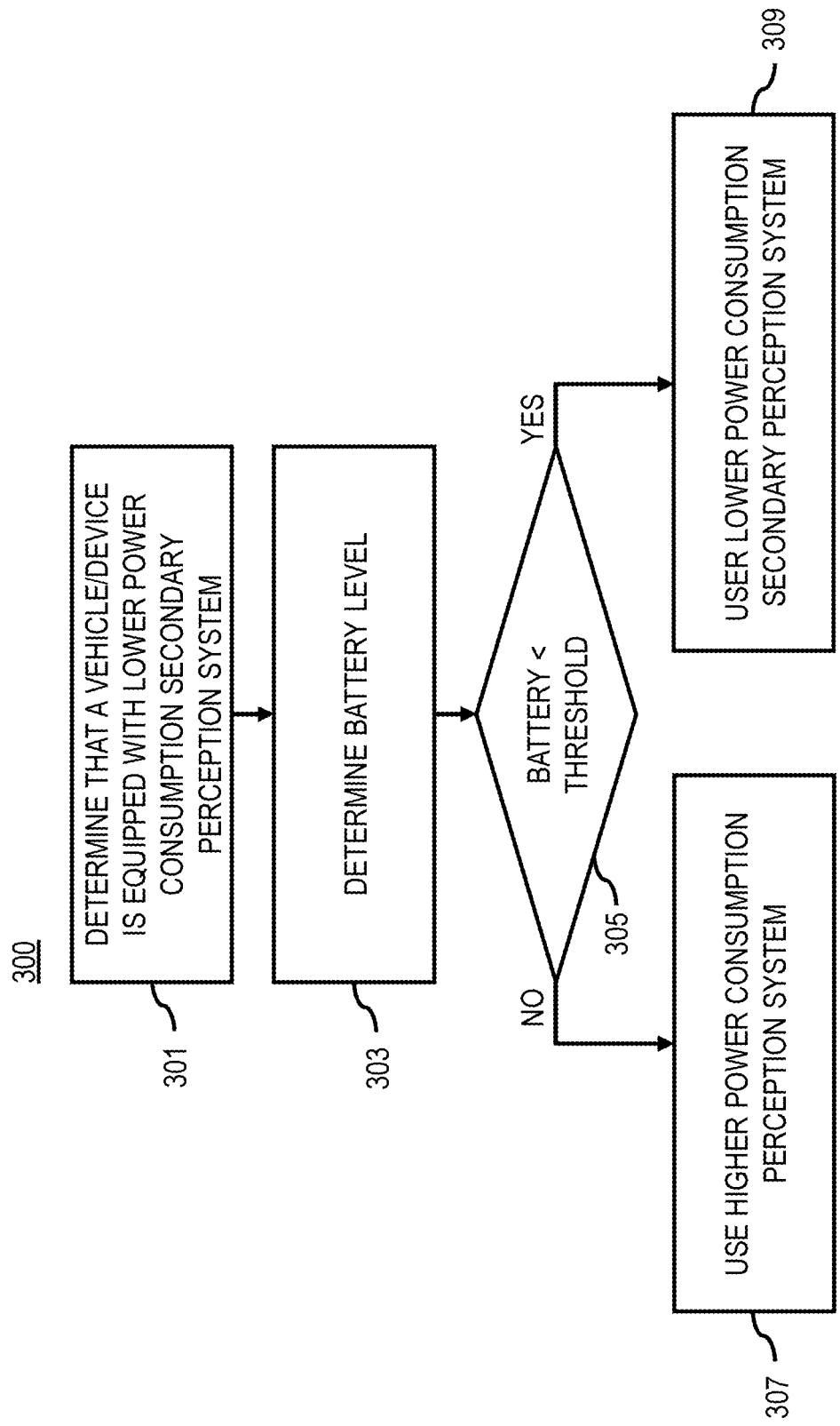
FIG. 3 is a flowchart of a process for selecting a perception system based on power consumption, according to one embodiment.
Figure 9:
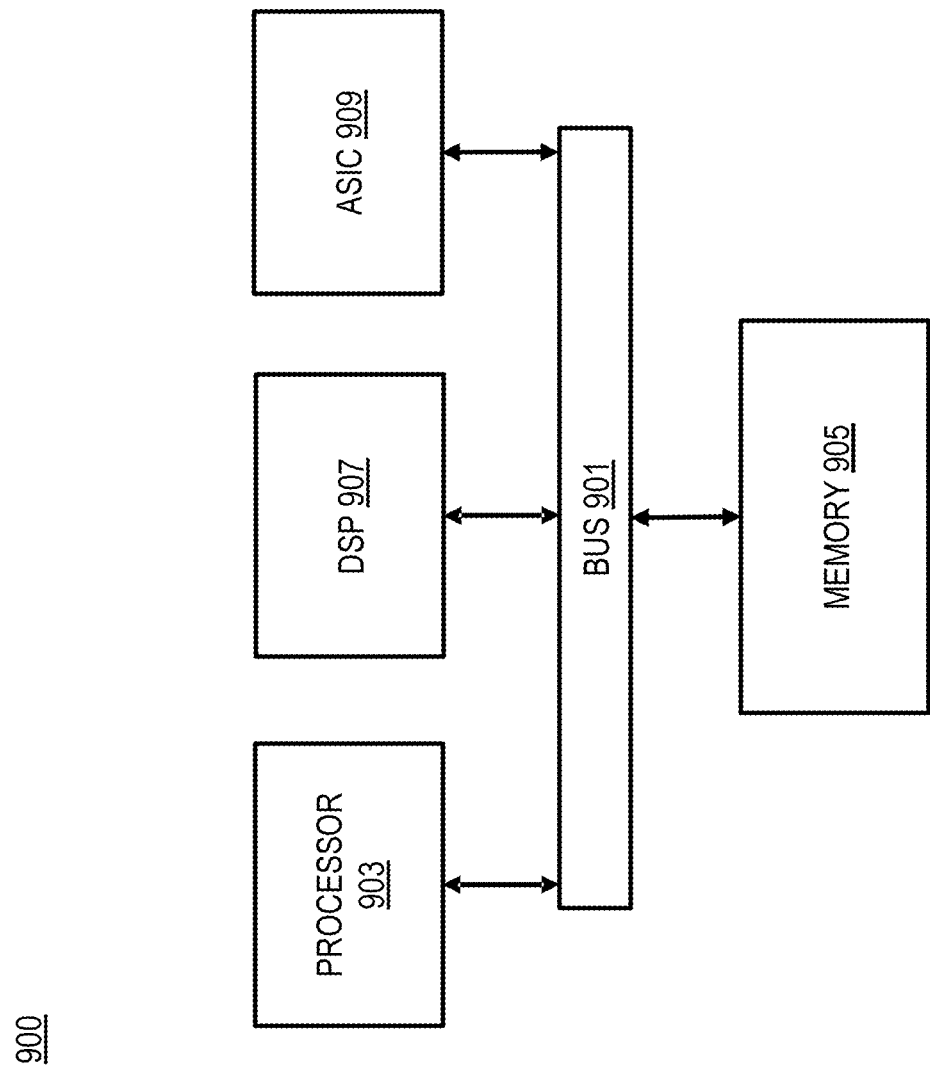
FIG. 9 is a diagram of a chip set that can be used to implement an embodiment of the invention.

FIG. 3 is a flowchart of a process for selecting a perception system based on power consumption, according to one embodiment. In various embodiments, the perception platform 113, perception system 107, and/or any of the modules 201-205 may perform one or more portions of the process 300 and may be implemented in, for instance, a chip set including a processor and a memory as shown in FIG. 9. As such, the perception platform 113, perception system 107, and/or any of the modules 201-205 can provide means for accomplishing various parts of the process 300, as well as means for accomplishing embodiments of other processes described herein in conjunction with other components of the system 100. Although the process 300 is illustrated and described as a sequence of steps, its contemplated that various embodiments of the process 300 may be performed in any order or combination and need not include all of the illustrated steps.

As discussed above, one aspect of the embodiments described herein relates to deploying multiple perception systems 111 to a device (e.g., the vehicle 101, UE 109, or component thereof. These multiple perception systems 111 have differing power consumption rates. For example, a high power consumption perception system 111*a* and one or more secondary low power consumption perception systems 111. In one embodiment, the low power consumption perception systems 111 are optimized (e.g., via embodiments of the process 400 of FIG. 4 described below, or equivalent) are configured to perform image recognition at different power consumption rates.

Accordingly, in step 301, the power sensing module 201 determines that a device is equipped a first perception system (e.g., a high power consumption perception system 111*a*) and a second perception system (e.g., a low power consumption perception system 111*n*). The terms "high" and "low" power consumption define relative power consumption rates between the two perception systems 111*a* and 111*n*. In other words, high power of the perception system 111*a* indicates that the perception system 111*a* consumes more power (e.g., electrical power provided a battery pack of the corresponding vehicle 101 or UE 109) relative to the low power consumption perception system 111*n* so that high or low refers to a relative relationship. Accordingly, in one embodiment, the second perception system operates in a lower-power consumption mode than the first perception system to process image data for image recognition. In another embodiment, the terms high and low power consumption can refer to respective ranges of power consumption values. For example, in embodiments where there are more than one secondary low power perception systems 111 equipped in the vehicle 101 and/or UE 109, each of the perception systems can be associated with a power consumption range that triggers use of the respective perception system 111.

In step 303, the power sensing module 201 determines a battery level of the device. It is contemplated that the power sensing module 201 can use any means for determining the battery level. For example, the power sensing module 201 may include an interface (e.g., an OBD II interface) that can directly interface with the vehicle 101 and/or UE 109 to determine the battery level. In other embodiments, the power sensing module 201 can receive the battery level data by querying the vehicle 101 and/or UE 109 or any other service (e.g., services platform 117 and/or any of its services 119*a*-119*m*) over a communication network 121.

In step 305, the power sensing module 201 compares the determined battery level to a battery threshold value (or multiple battery level thresholds if there are multiple secondary low power perception systems 111). If the battery level is above the battery threshold level (or meets the corresponding battery level range), then the system selection module 203 uses or continues to use the default high power consumption perception system 111*a* (e.g., the first perception system) (step 307). If the battery level is below the battery threshold level or meets a corresponding range, then the system selection module 203 switches from the first perception system (e.g., high power perception system 111*a*) to the second perception system (e.g., low power perception system 111*n*) based on determining that the battery level is below a threshold battery level (step 309). In one embodiment, the power sensing module 201 can continue to monitor and switch back and forth between the available high and low power perception systems 111 as the battery level of the vehicle 101 and/or UE 109 is depleted and/or recharged.

Figure 4:
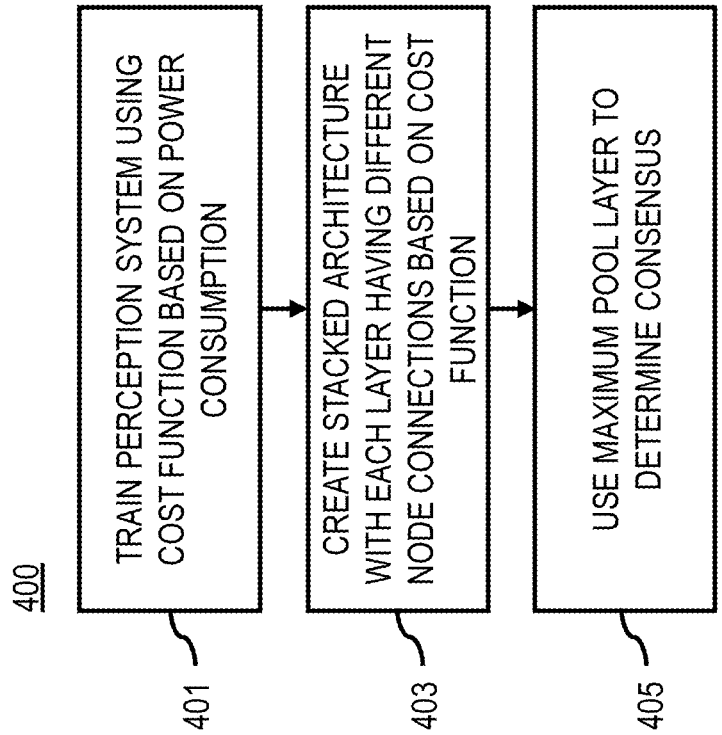
FIG. 4 is a flowchart of a process for training a perception system using power consumption as a cost function, according to one embodiment.

In another aspect of the embodiments described herein, the perception platform 113 can train corresponding perception system 111 to process images at lower power consumption rates. FIG. 4 is a flowchart of a process for training a perception system using power consumption as a cost function, according to one embodiment. In various embodiments, the perception platform 113, perception system 107, and/or any of the modules 201-205 may perform one or more portions of the process 400 and may be implemented in, for instance, a chip set including a processor and a memory as shown in FIG. 9. As such, the perception platform 113, perception system 107, and/or any of the modules 201-205 can provide means for accomplishing various parts of the process 400, as well as means for accomplishing embodiments of other processes described herein in conjunction with other components of the system 100. Although the process 400 is illustrated and described as a sequence of steps, its contemplated that various embodiments of the process 400 may be performed in any order or combination and need not include all of the illustrated steps.

In one embodiment, the loss function typically used in classification or regression problems involving training a neural network or equivalent machine learning 301 (e.g., is in the form of a cross-entropy loss. The embodiments described herein augment the traditional cross entropy loss (e.g., determined based on model prediction accuracy with respect to ground truth) with power-consumption loss (e.g., determined with respect to ground truth power consumption rates for different perception system architectures), so the joint optimization is one which minimizes power-consumption and maximizes the cross-entropy at training.

Accordingly, in step 401, the training module 205 trains the perception system 111 or a machine learning model 207 (e.g., neural network, support vector machine, Random forest, etc.) of the perception system 111. In one embodiment, the training module 205 trains the machine learning model 207 using the ground truth image data to recognize objects of interest. The training module 205 can then train the machine learning model 207 of a perception system 107 (e.g., a neural network, support vector machine, or equivalent) by obtaining a feature vector or matrix comprising the selected training features. During the training process, the training module 205 feeds the feature vectors or matrices of the training data set (e.g., the ground truth data) into the machine learning model 207 to recognize objects in the image data. The training module 205 then compares the predicted objects to the ground truth labels indicating ground truth objects present in training data set. As indicated above in one embodiment, the comparison can be based on a cost function in the form of cross-entropy loss to optimize the model parameters.

For example, based on this comparison, the training module 205 computes an accuracy of the predictions or classifications for the initial set of model parameters (e.g., a cross-entropy loss). If the accuracy or level of performance does not meet a threshold or configured level, the training module 205 incrementally adjusts the model parameters until the machine learning model 207 generates predictions at the desired level of accuracy with respect to the predicted sensor error. In one embodiment, in addition or alternatively, the training module 205 can compute a power-consumption-based loss function that incrementally adjusts the model parameters to minimize power consumption. In other words, the "trained" machine learning model 207 is a model whose parameters are adjusted to make accurate predictions while also minimizing power consumption of the perception system 111 using the trained machine learning model 207 with respect to the ground truth data.

In one embodiment, the determine the best or optimal architecture (e.g., set of model parameters) of the machine learning model 207, the training module 205 can use a fuzzy approach to identify all possible subgraphs within a specified architecture, ensuring complete coverage of the search space. In one embodiment, the model parameters can include but is not limited to connections between nodes (e.g., input nodes, hidden nodes, output nodes) of the machine learning model. Accordingly, the architecture can represent the topology of the of the connections and/or their model weights to process image data received at an input node via connections to the hidden nodes to produce the output of an output node (e.g., an object feature classification recognized from the input image data). The respective search space (e.g., a range of perception system architectures area corresponding to a predicted power consumption of a power optimized perception system architecture) is then calculated. Convergence then refers to identifying a common architecture among the different search spaces that is the most likely to represent the optimum architecture with respect to prediction accuracy and reduced power consumption.

Figure 5:
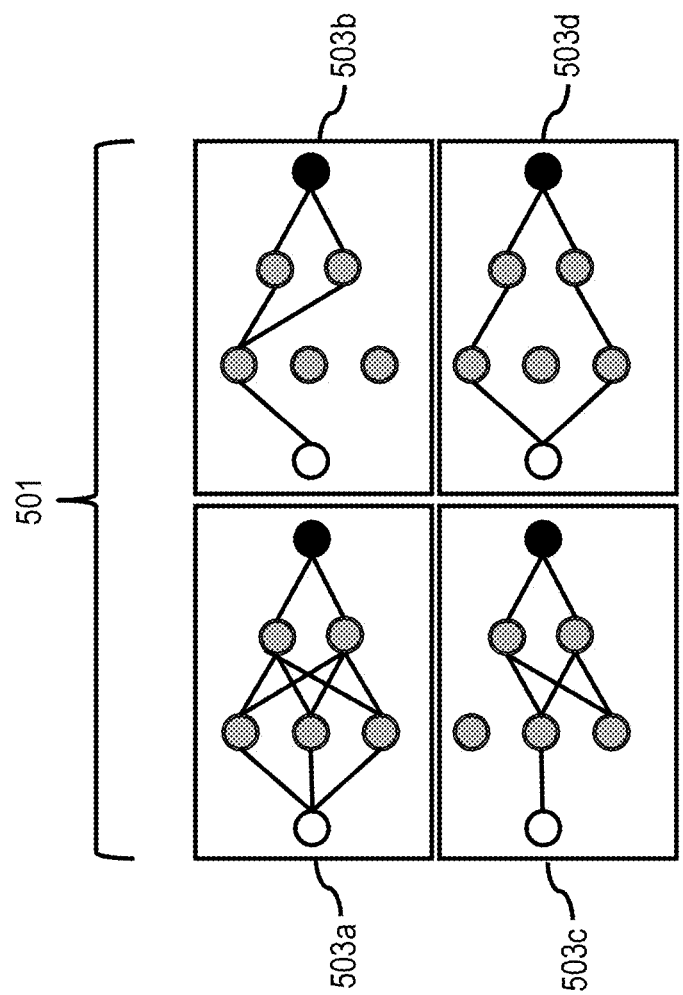
FIG. 5 is a diagram of example perception system node connections, according to one embodiment.

FIG. 5 is a diagram of example perception system node connections, according to one embodiment. In the example of FIG. 5, a set 501 of possible architectures (e.g., node connections) of neural network is illustrated including architectures 503a-503d (also collectively referred to as architectures 503). As shown in each architecture 503, an input node is a white circle, an output node is a black circle, and hidden nodes are gray circles. The different connections across each architecture or network of nodes of the neural network are evaluated for low-power consumption and accuracy as described above. For example, maintaining a minimum number of connections while also balancing accuracy of the output classification can determine an optimum architecture of the network of nodes to create a low power perception system 111. In other words, the training module 205 can evaluate among the at least one input node, the at least one hidden node, the at least one output node, or a combination therefore against one or more levels of the power consumption, one or more levels of the accuracy, or a combination.

As indicated above, in one embodiment, to determine the best or optimal architecture for low power consumption and accuracy from among the architectures 503, the training module 205 can identify all possible subgraphs with a specified architecture. For example, a specified architecture may specify a range of connection possibilities between selected nodes that are to be classified as belonging to the same architecture, and then treat the architecture and all subgraphs (e.g., all graphs falling within or meeting the specific connect criteria or ranges). In another example, the training module 205 can specify ranges or levels of power consumption and/or accuracy, and then create a plurality of perception architectures based on connections corresponding to each range or level.

Figure 6:
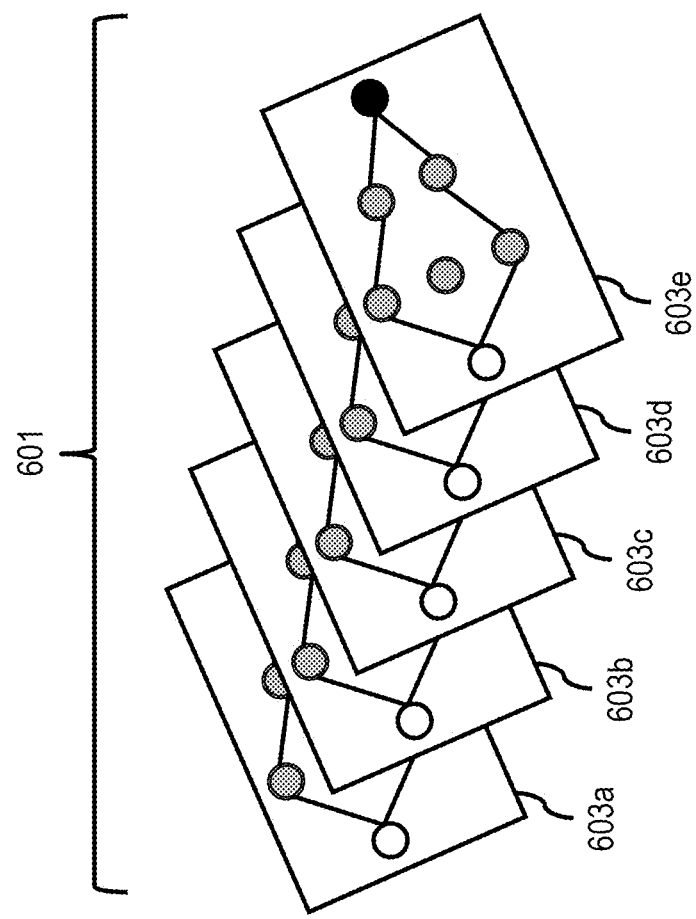
FIG. 6 is a diagram of a stacked perception system architecture, according to one embodiment.

In one embodiment, as shown in the example of FIG. 6, the training module 205 can stack an architecture with its subgraphs to create a stacked architecture 601 comprising a plurality of layers 603a-603e with each layer representing one choice of a network architecture (step 403). Subsequently, all possible subsets of the different architectures represented in the stacked architecture 601 are considered as candidate neural node networks or architectures on which the lost function (e.g., power-consumption based loss function) is evaluated. In one embodiment, the training module 205 can use a maximum pool layer of the stacked architecture to determine a consensus over the outputs of each of the layers of architectures (step 405). The best-performing network or architecture (e.g., one that minimizes the loss function) is then selected and deployed (e.g., to the vehicle 101 and/or UE 109) as the low-power perception system 111. In one embodiment, other networks or architectures with different power consumption rates can be maintained with corresponding power consumption levels to switch to at runtime depending on detected battery levels (e.g., as described with respect to the process 300 of FIG. 3).

In one embodiment, the embodiments described herein, for instance, enables the system 100 to switch perception system architectures on the fly based on a continuum of available power/battery levels in addition to or as an alternate to switching between just a high and low power perception system as describe with respect to an example embodiment. In addition, joint optimization of classification/regression performance and power consumption (e.g., model training using a loss function consider accuracy and/or power consumption) can guarantee worst-case performance measures as relevant to maintaining available power for vehicle safety features.

In one embodiment, the embodiments of providing a low-power perception system can be used for any application requiring image/object recognition from image data. For example, with respect to lane localization and also generally with respect to autonomous driving, high accuracy and real-time localization of vehicles 101 is needed. Traditionally, most vehicle navigation systems have accomplished this localization using GPS-based location sensors, which generally provide a real-time location with a 95% confidence interval of 7.8 meters. However, in complicated urban environments, reflection of GPS signals can further increase this error, such that one's location may be off by as much as 30 meters. In other words, the challenge with raw-sensor readings such as those from GPS or equivalent is that systematic errors, stemming from multipath reflection in areas such as urban canyons, cause inaccurate readings from the location sensor. Given that the width of many lanes is 3-4 meters, this accuracy is not sufficient to properly localize the vehicle 101 (e.g., an autonomous vehicle) so that it can make safe route planning decisions. While sensor fusion using other sensors, such as inertial sensors (INS) or inertial measurement units (IMUs) can increase the accuracy of localization by taking into account vehicle movement, the systematic errors in urban canyons or other similar terrain features that result in sensor interference can result in incorrectly positioning the vehicle 101 by as much as several blocks away from its true location.

In general, a localization accuracy of around 10 cm or better is needed for safe driving in many areas (e.g., safe autonomous driving). Traditionally, in order to solve the technical issue of error-prone GPS location data in challenge terrain (e.g., dense urban canyons), two GPS sensors can be used to compute a differential sensor reading that accounts for systematic biases or sensor error. However, maintaining multiple location sensors to support differential sensor readings can increase overhead costs (e.g., in terms of both technical resources and monetary costs). To address these limitations, the system 100 can use the embodiments of low power perception systems 111 described herein to localized using visual odometry against known map features (e.g., signs, lane markings, etc.) to determine a location of the vehicle 101 and/or UE 109.

Returning to FIG. 1, in one embodiment, the perception platform 113 has connectivity over a communication network 121 to the services platform 117 (that provides one or more services 119. By way of example, the services 119 may also be other third-party services and include mapping services, navigation services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 117 uses the output (e.g., predictions made by the low power perception system 111) to provide services such as navigation, mapping, other location-based services, etc.

In one embodiment, the perception platform 113 may be a platform with multiple interconnected components and may include multiple servers, intelligent networking devices, computing devices, components and corresponding software for predicting sensor error. In addition, it is noted that the perception platform 113 may be a separate entity of the system 100, a part of the one or more services 119, a part of the services platform 117, or included within the vehicle 101 (e.g., as a perception module 107).

In one embodiment, content providers 123a-123k (collectively referred to as content providers 123) may provide content or data (e.g., including geographic data, sensor data, etc.) to a geographic database 125 (e.g., for localization using the image recognition output of the low power perception system 111), the perception platform 113, the services platform 117, the services 119, and the vehicle 101. The content provided may be any type of content, such as map content, textual content, audio content, video content, image content, etc. In one embodiment, the content providers 123 may provide content that may aid in predicting sensor error. In one embodiment, the content providers 123 may also store content associated with the geographic database 125, perception platform 113, services platform 117, services 119, and/or vehicle 101. In another embodiment, the content providers 123 may manage access to a central repository of data, and offer a consistent, standard interface to data, such as a repository of the geographic database 125.

By way of example, the UE 109 can be any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 109 can support any type of interface to the user (such as "wearable" circuitry, etc.). In one embodiment, the UE 109 may be associated with the vehicle 101 or be a component part of the vehicle 101.

In one embodiment, the vehicle 101 is configured with various sensors for generating or collecting vehicular sensor data, related geographic/map data, etc. In one embodiment, the sensed data represent sensor data associated with a geographic location or coordinates at which the sensor data was collected. In this way, the sensor data can act as observation data that can be aggregated into location-aware training and evaluation data sets. By way of example, the sensors may include a RADAR system, a LiDAR system, a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on steering wheels of the vehicles, switch sensors for determining whether one or more vehicle switches are engaged, and the like.

Other examples of sensors of the vehicle 101 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the vehicle 101 may detect the relative distance of the vehicle from a physical divider, a lane or roadway, the presence of other vehicles, pedestrians, traffic lights, potholes and any other objects, or a combination thereof. In one scenario, the sensors may detect weather data, traffic information, or a combination thereof. In one embodiment, the vehicle 101 may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 121 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the perception platform 113, services platform 117, services 119, vehicle 101, and/or content providers 123 communicate with each other and other components of the system 100 using well known, new or still developing protocols. In this context, a protocol includes a set of rules defining how the network nodes within the communication network 121 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 7:
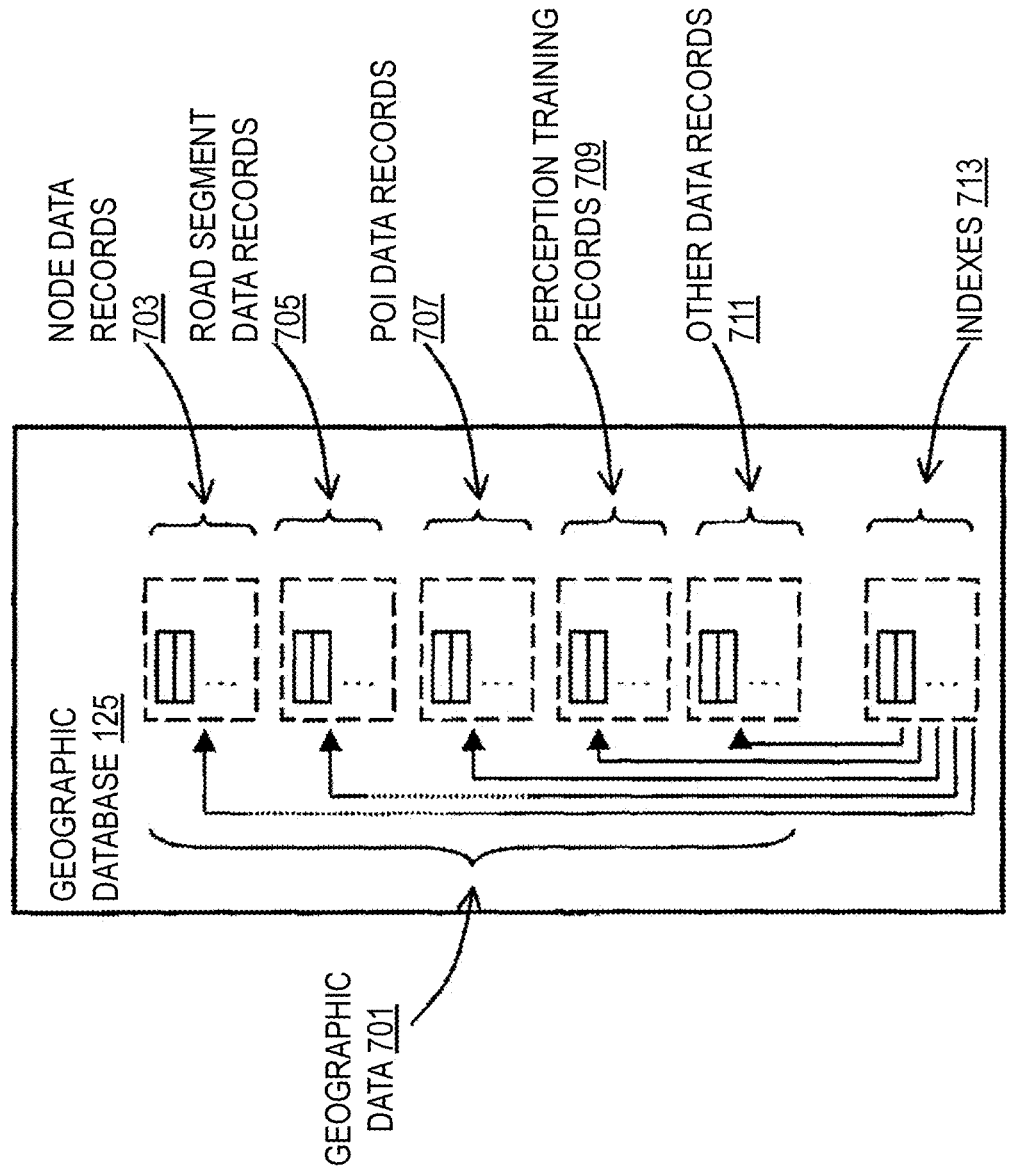
FIG. 7 is a diagram of a geographic database, according to one embodiment.

FIG. 7 is a diagram of a geographic database, according to one embodiment. In one embodiment, the geographic database 125 includes geographic data 701 used for (or configured to be compiled to be used for) mapping and/or navigation-related services. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the geographic database 125 includes high resolution or high definition (HD) mapping data that provide centimeter-level or better accuracy of map features. For example, the geographic database 125 can be based on Light Detection and Ranging (LiDAR) or equivalent technology to collect billions of 3D points and model road surfaces, structures, buildings, terrain, and other map features down to the number lanes and their widths. In one embodiment, the HD mapping data capture and store details such as the slope and curvature of the road, parking spots, lane markings, roadside objects such as sign posts, including what the signage denotes, etc. By way of example, the HD mapping data enable highly automated vehicles to precisely localize themselves on the road, and to determine road attributes (e.g., learned speed limit values) to at high accuracy levels.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably. In one embodiment, the following terminology applies to the representation of geographic features in the geographic database 125.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non-reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 125 follows certain conventions. For example, links do not cross themselves and do not cross each other except at a node. Also, there are no duplicated shape points, nodes, or links. Two links that connect each other have a common node. In the geographic database 125, overlapping geographic features are represented by overlapping polygons. When polygons overlap, the boundary of one polygon crosses the boundary of the other polygon. In the geographic database 125, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 125 includes node data records 703, road segment or link data records 705, POI data records 707, perception training records 709, other records 711, and indexes 713, for example. More, fewer or different data records can be provided. In one embodiment, additional data records (not shown) can include cartographic ("carto") data records, routing data, and maneuver data. In one embodiment, the indexes 713 may improve the speed of data retrieval operations in the geographic database 125. In one embodiment, the indexes 713 may be used to quickly locate data without having to search every row in the geographic database 125 every time it is accessed. For example, in one embodiment, the indexes 713 can be a spatial index of the polygon points associated with stored feature polygons.

In exemplary embodiments, the road segment data records 705 are links or segments representing roads, streets, or paths, as can be used in the calculated route or recorded route information for determination of one or more personalized routes. The node data records 703 are end points corresponding to the respective links or segments of the road segment data records 705. The road link data records 705 and the node data records 703 represent a road network, such as used by vehicles, cars, and/or other entities. Alternatively, the geographic database 125 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 125 can include data about the POIs and their respective locations in the POI data records 707. The geographic database 125 can also include data about places, such as cities, towns, or other communities, and other geographic features, such as bodies of water, mountain ranges, etc. Such place or feature data can be part of the POI data records 707 or can be associated with POIs or POI data records 707 (such as a data point used for displaying or representing a position of a city).

In one embodiment, the geographic database 125 can also include perception training records 809 for storing training data, node networks, architectures, power consumption levels, and/or related data generated or consumed in the embodiments described herein. In one embodiment, predicted object classifications from image recognition can also be stored as attributes of the perception training data records 709. In one embodiment, the perception training data records 709 can be associated with segments of a road link (as opposed to an entire link). It is noted that the segmentation of the road for the purposes of training perception systems can be different than the road link structure of the geographic database 125. In other words, the segments can further subdivide the links of the geographic database 125 into smaller segments (e.g., of uniform lengths such as 5-meters). In this way, model training can be performed at a level of granularity that is independent of the granularity or at which the actual road or road network is represented in the geographic database 125.

In one embodiment, the geographic database 125 can be maintained by the content provider 123 in association with the services platform 117 (e.g., a map developer). The map developer can collect geographic data to generate and enhance the geographic database 125. There can be different ways used by the map developer to collect data. These ways can include obtaining data from other sources, such as municipalities or respective geographic authorities. In addition, the map developer can employ field personnel to travel by vehicle along roads throughout the geographic region to observe features (e.g., physical dividers, OPPO, VRU, etc.) and/or record information about them, for example. Also, remote sensing, such as aerial or satellite photography, can be used.

The geographic database 125 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing a low power perception system may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
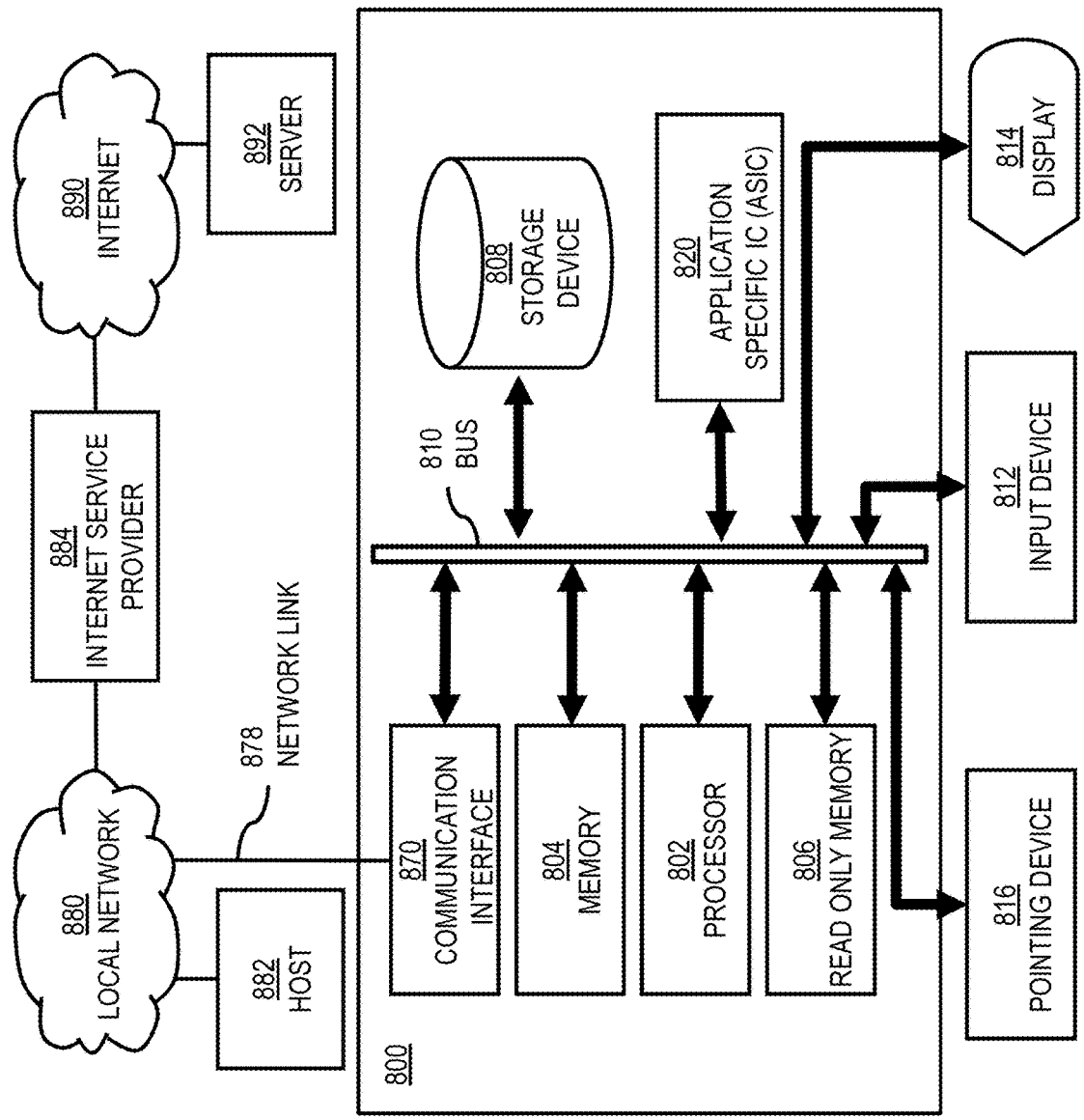
FIG. 8 is a diagram of hardware that can be used to implement an embodiment of the invention.

FIG. 8 illustrates a computer system 800 upon which an embodiment of the invention may be implemented. Computer system 800 is programmed (e.g., via computer program code or instructions) to provide a low power perception system as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 810 includes one or more parallel conductors of information so that information is transferred quickly among devices coupled to the bus 810. One or more processors 802 for processing information are coupled with the bus 810.

A processor 802 performs a set of operations on information as specified by computer program code related to providing a low power perception system. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for providing a low power perception system. Dynamic memory allows information stored therein to be changed by the computer system 800. RANI allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing a low power perception system, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 121 for providing a low power perception system.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 9 illustrates a chip set 900 upon which an embodiment of the invention may be implemented. Chip set 900 is programmed to provide a low power perception system as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide a low power perception system. The memory 905 also stores the data associated with or generated by the execution of the inventive steps.

Figure 10:
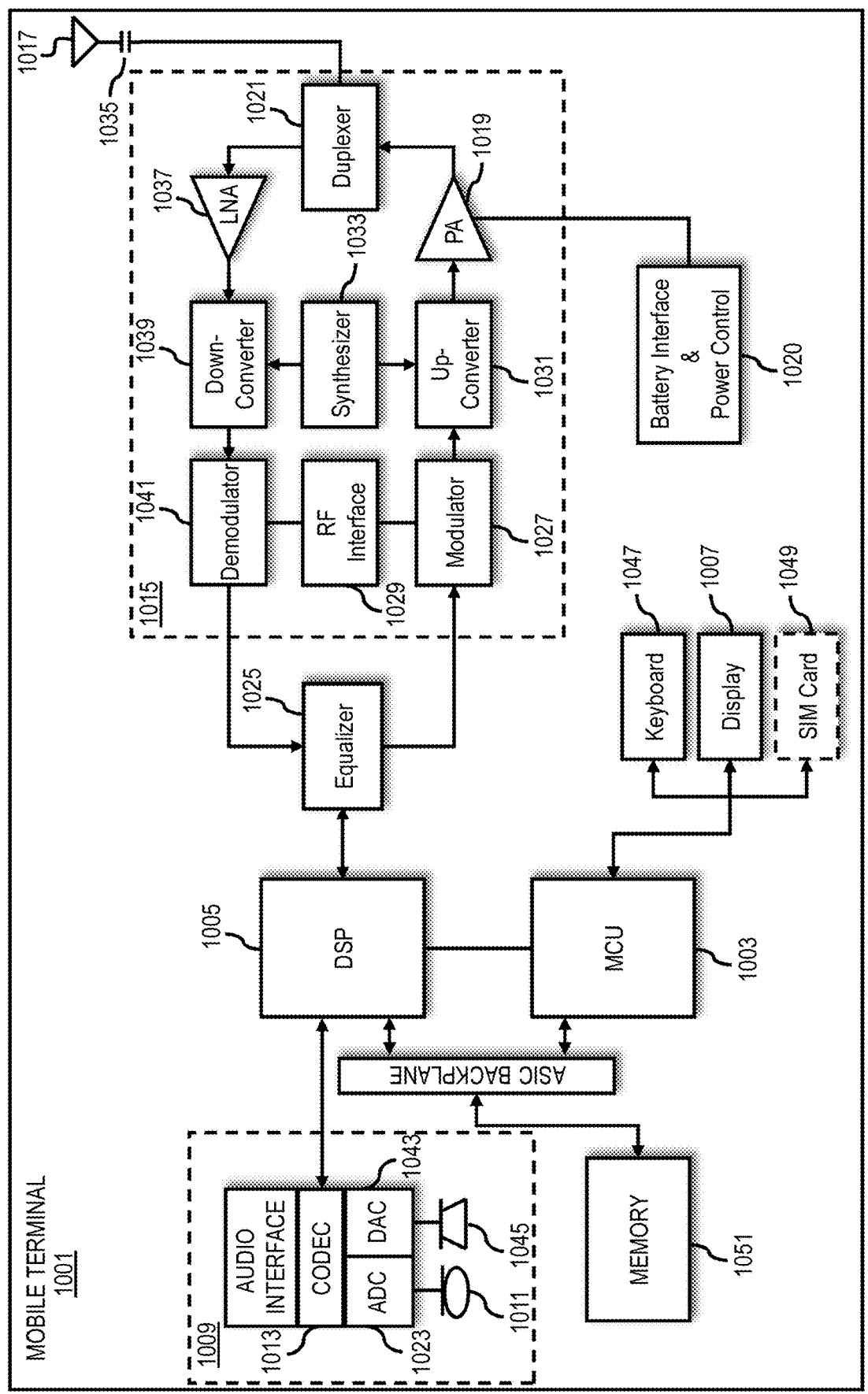
FIG. 10 is a diagram of a terminal that can be used to implement an embodiment of the invention.

FIG. 10 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile station functions that offer automatic contact matching. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile station 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile station 1001 to provide a low power perception system. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the station. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile station 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1051 may be, but not limited to, a single memory, CD, DVD, ROM, RAM, EEPROM, optical storage, or any other non-volatile or non-transitory storage medium capable of storing digital data.

An optionally incorporated SIM card 1049 carries, for instance, important information, such as the cellular phone number, the carrier supplying service, subscription details, and security information. The SIM card 1049 serves primarily to identify the mobile station 1001 on a radio network. The card 1049 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for providing a low-power perception architecture comprising:

determining that a device is equipped with a first perception system and a second perception system, wherein the second perception system operates in a lower-power consumption mode than the first perception system to process image data for image recognition, and wherein the second perception system comprises a machine learning module trained to recognize objects in the image data;

determining a battery level of the device; and switching from the first perception system to the second perception system based on determining that the battery level is below a threshold battery level.

2. The method of claim 1, further comprising:

training the machine learning model of the second perception system using a cost function based on a power consumption of the machine learning model when used for the image recognition.

3. The method of claim 2, wherein the cost function is further based on an accuracy of the machine learning model when performing the image recognition.

4. The method of claim 3, wherein the machine learning model includes at least one input node, at least one hidden node, and at least one output node.

5. The method of claim 4, further comprising:

evaluating a plurality of connections among the at least one input node, the at least one hidden node, the at least one output node, or a combination thereof against one or more levels of the power consumption, one or more levels of the accuracy, or a combination thereof.

6. The method of claim 5, further comprising:

creating a plurality of perception architectures based on the plurality of connections corresponding to each of the one or more levels of the power consumption, the one or more levels of the accuracy, or a combination thereof.

7. The method of claim 6, further comprising:

creating a stacked architecture comprising a plurality of layers, wherein each of the plurality of layers is a respective one of the plurality of perception architectures.

8. The method of claim 7, further comprising:

using a maximum pool layer of the stacked architecture to determine a consensus over respective outputs of said each of the plurality of layers.

9. The method of claim 8, wherein the maximum pool layer has a maximum number of connections among the at least one input node, the at least one hidden node, the at least one output node, or a combination thereof.

10. The method of claim 1, wherein the device is a vehicle or a component of the vehicle.

11. An apparatus for predicting sensor error, comprising:

at least one processor; and at least one memory including computer program code for one or more programs, the at least one memory and the computer program code configured to, with the at least one processor, cause the apparatus to perform at least the following, determine that a device is equipped with a first perception system and a second perception system, wherein the second perception system operates in a lower-power consumption mode than the first perception system to process image data for image recognition, and wherein the second perception system comprises a machine learning module trained to recognize objects in the image data;

determine a battery level of the device; and switch from the first perception system to the second perception system based on determining that the battery level is below a threshold battery level.

12. The apparatus of claim 11, wherein the apparatus is further caused to:

train the machine learning model of the second perception system using a cost function based on a power consumption of the machine learning model when used for the image recognition.

13. The apparatus of claim 12, wherein the cost function is further based on an accuracy of the machine learning model when performing the image recognition.

14. The apparatus of claim 13, wherein the machine learning model includes at least one input node, at least one hidden node, and at least one output node.

15. The apparatus of claim 14, wherein the apparatus is further caused to:

evaluate a plurality of connections among the at least one input node, the at least one hidden node, the at least one output node, or a combination thereof against one or more levels of the power consumption, one or more levels of the accuracy, or a combination thereof.

16. A non-transitory computer-readable storage medium for predicting sensor error, carrying one or more sequences of one or more instructions which, when executed by one or more processors, cause an apparatus to at least perform the following steps:

determining that a device is equipped with a first perception system and a second perception system, wherein the second perception system operates in a lower-power consumption mode than the first perception system to process image data for image recognition, and wherein the second perception system comprises a machine learning module trained to recognize objects in the image data;

determining a battery level of the device; and switching from the first perception system to the second perception system based on determining that the battery level is below a threshold battery level.

17. The non-transitory computer-readable storage medium of claim 16, wherein the apparatus is caused to further perform:

training the machine learning model of the second perception system using a cost function based on a power consumption of the machine learning model when used for the image recognition.

18. The non-transitory computer-readable storage medium of claim 17, wherein the cost function is further based on an accuracy of the machine learning model when performing the image recognition.

19. The non-transitory computer-readable storage medium of claim 18, wherein the machine learning model includes at least one input node, at least one hidden node, and at least one output node.

20. The non-transitory computer-readable storage medium of claim 19, wherein the apparatus is caused to further perform:

evaluating a plurality of connections among the at least one input node, the at least one hidden node, the at least one output node, or a combination thereof against one or more levels of the power consumption, one or more levels of the accuracy, or a combination thereof.

* * * * *